2 Sheets—Sheet 1.

H. TURNER.
Car-Starter.

No. 218,647.      Patented Aug. 19, 1879.

WITNESSES:
Geo. R. Byington.
W. T. Hutchinson

INVENTOR
Howard Turner
By Norman W. Stearns,
ATT'Y

N. PETERS, PHOTO-LITHOGRAPHER, WASHINGTON, D. C.

2 Sheets—Sheet 2.

H. TURNER.
Car-Starter.

No. 218,647. Patented Aug. 19, 1879.

WITNESSES
Geo. R. Byington.
W. T. Hutchinson

INVENTOR
Howard Turner,
By Norman W. Stearns
ATT'Y

UNITED STATES PATENT OFFICE.

HOWARD TURNER, OF BOSTON, MASSACHUSETTS, ASSIGNOR TO ROSWELL W. TURNER, OF SAME PLACE.

IMPROVEMENT IN CAR-STARTERS.

Specification forming part of Letters Patent No. 218,647, dated August 19, 1879; application filed June 16, 1879.

*To all whom it may concern:*

Be it known that I, HOWARD TURNER, of Boston, in the county of Suffolk and State of Massachusetts, have invented certain Improvements in Car-Starters, of which the following is a full, clear, and exact description, reference being had to the accompanying drawings, making part of this specification, in which—

Figure 1:
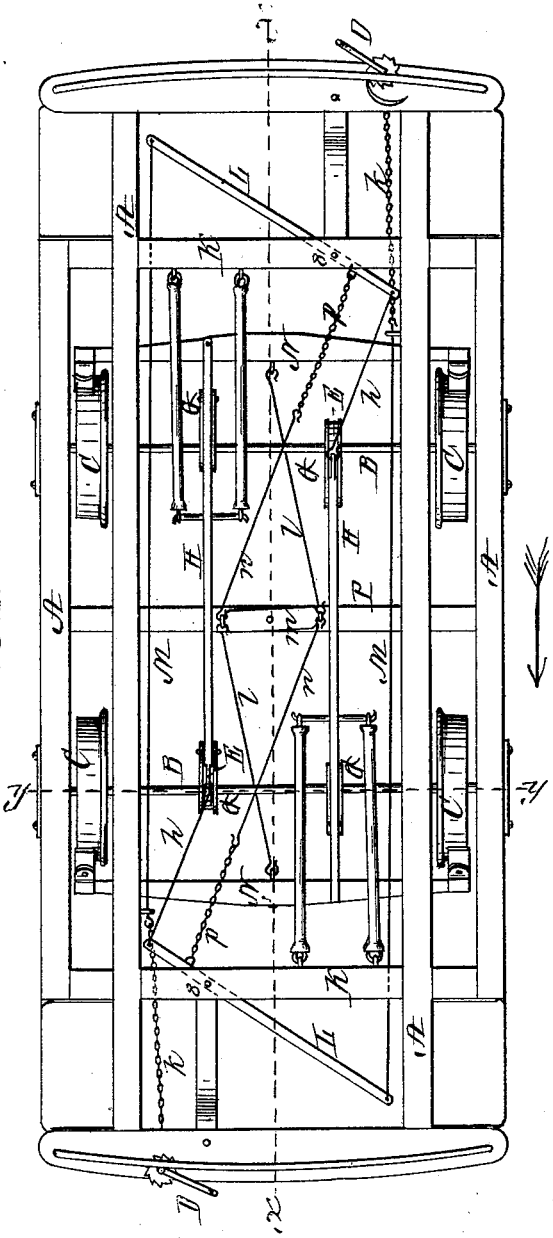
Figure 2:
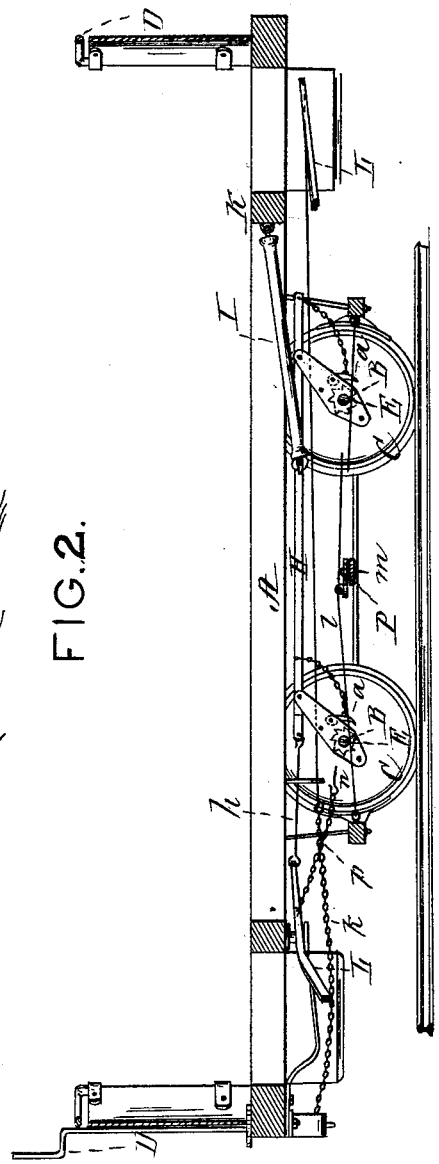
Figure 3:
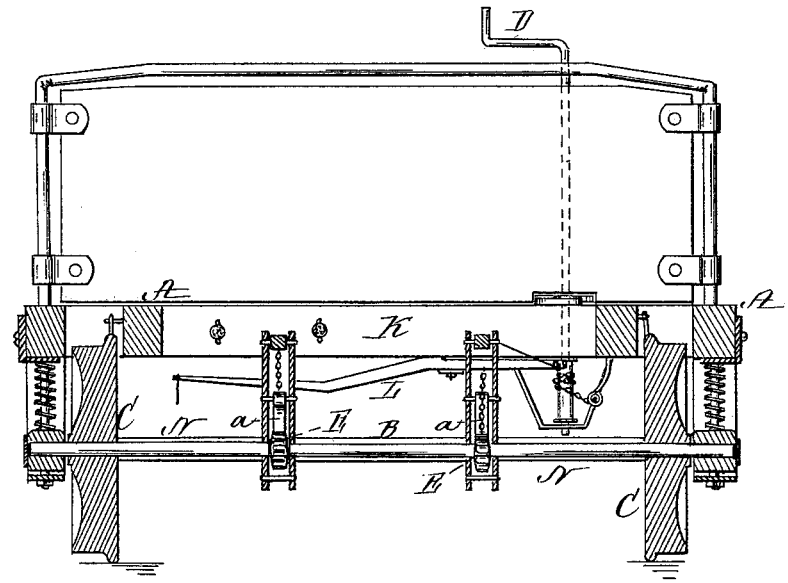
Figure 4:
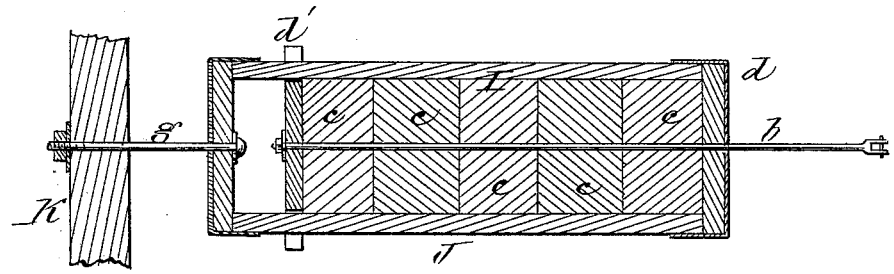

Figure 1 is a plan of the truck-frame of a street-car with my starting mechanism applied thereto. Fig. 2 is a vertical longitudinal section on the line $x\,x$ of Fig. 1. Fig. 3 is a transverse section on the line $y\,y$ of Fig. 1. Fig. 4 is a spring of the form preferably employed.

My present invention relates to that class of mechanical devices termed "car-starters," and has for its object to give impetus to the car-wheels independently of, but simultaneously with, the draft of the horses, whereby they are relieved of much of the strain and consequent injury incident to overcoming the inertia of cars of the ordinary construction when at rest; and my invention consists in a peculiar system of springs connected by rods with rocker-arms fitting loosely on the axles, and provided with pawls, which engage with and hold ratchet-wheels rigidly secured to the axles, each connecting-rod being attached to a lever operated by the mechanism which forces the brake against the wheels, the several parts being so combined and arranged that on application of the brakes to stop the car the springs are compressed, while the release of the brake mechanism allows of their instant recoil with such power that, through their connections with the ratchet-wheels, the car-wheels are given a partial revolution forward, thus overcoming the dead-weight of the mass and materially assisting the horses in starting.

To enable others skilled in the art to understand and use my invention, I will proceed to describe the manner in which I have carried it out.

In the said drawings, A represents the truck-frame of a street-car; B B the axles, C C the wheels, and D D the cranks, of the vertical shafts for winding up or applying the brakes thereto. To each axle is rigidly secured a pair of ratchet-wheels, E E, with which engage pawls $a\,a$, each pivoted within a hollow rocker-arm, G, secured loosely to the axle, and inclosing one of the ratchet-wheels E. The upper end of each rocker-arm is pivoted to a long connecting-rod, H, not far from its end, two rocker-arms being pivoted to each connecting-rod. To each connecting-rod is secured a rod, $b$, passing centrally through a series of rubber blocks or sections, $c$, (forming a spring, I,) and through plates $d\,d'$, Fig. 4, the latter sliding on the two parallel portions of a frame, J, to which is secured a short bolt, $g$, screwed into one of the transverse beams K of the truck-frame. The end of each connecting-rod (opposite to that where the spring is attached) is united by a rod, $h$, with the shorter arm of a long brake-lever, L, pivoted at 8 to the under side of one of the cross-beams K, the other end (the end of the long arm) of this lever being connected by a long rod, M, with the chain $k$, which is taken up by turning the crank of the shaft of the brake-applying mechanism. To the center of each brake N is secured one end of a rod or wire, $l$, the other end of which is attached to one end of a swinging piece, $m$, pivoted centrally to a stay, P, extending transversely between the lower portions of the truck-frame, and a rod or wire, $n$, and chain $p$ connect the same end of the swinging piece $m$ with the shorter arm of the lever L on the opposite end of the truck.

From the foregoing construction it will be seen that when the car is moving in the direction of the arrow the chains $k\,k$ are slack and the brakes are out of contact with the wheels C C, the parts being in the position seen in plan, Fig. 1, and by the full lines in section, Fig. 2, the rocker-arms attached to one connecting-rod H being in a line vertically above the axles to which they are fitted.

When it is desired to stop the car the forward crank is turned by the driver, so as to wind the chain around the drum on the lower end of the forward shaft, thus clamping both brakes upon the peripheries of the four wheels C C, simultaneous with which one of the connecting-rods H is drawn back against the resistance of its spring I, which operation inclines both rocker-arms of this rod, carrying their upper ends to the rear, or back of the planes of the axles, in which position their pawls *a a* engage with their ratchets E E, thus holding the spring I in its compressed state, the other connecting-rod H, with its spring rocker-arms and pawls, being in their normal position. The car is started by turning the same (forward) crank in the opposite direction to loosen the chain, when the recoil of the spring will carry the connecting-rod forward, and the rocker-arms being brought to their former vertical position, the pawls acting on the ratchets cause them and the axles to which they are secured to be turned, and the wheels C C are given a partial revolution forward, thus overcoming the inertia of the car, and enabling the horses to draw it without the sudden strain and shock incident to starting a car not provided with a starting mechanism.

A spiral spring may be compressed in a manner similar to that of the rubber spring above described, or the recoil of either spring from an expanded state may be utilized as the motive power; but I prefer the employment of a spring constructed and operating as shown and described, as it is more efficacious and durable, and the arrangement of connecting-rods, springs, rocker-arms, pawls, and ratchet-wheels above set forth possesses the advantages of strength and permanency, which makes my invention a practical success in its application to a street-car.

I claim—

In combination, the springs I, connecting-rods H, rocker-arms G, pawls *a*, ratchet-wheels E, axles B, brake-levers L, and the winding-shafts with their connecting mechanism, arranged and operating in the manner and for the purpose set forth.

Witness my hand this 9th day of June, 1879.

HOWARD TURNER.

In presence of—
CHARLES W. TURNER,
MARTIN DUNLAP.